United States Patent
Takahashi et al.

(10) Patent No.: US 8,348,734 B2
(45) Date of Patent: Jan. 8, 2013

(54) GAME SYSTEM AND STORAGE MEDIUM FOR STORING GAME PROGRAM

(75) Inventors: Hiroyuki Takahashi, Shinjuku-ku (JP);
Shugo Takahashi, Shinjuku-ku (JP);
Haruki Kodera, Shinjuku-ku (JP);
Yusuke Sugimoto, Shinjuku-ku (JP);
Toru Takamatsu, Shinjuku-ku (JP);
Toshiharu Izuno, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1434 days.

(21) Appl. No.: 11/118,331

(22) Filed: May 2, 2005

(65) Prior Publication Data

US 2005/0255899 A1    Nov. 17, 2005

(30) Foreign Application Priority Data

May 7, 2004   (JP) .................................. 2004-138517
Oct. 15, 2004  (JP) .................................. 2004-302279

(51) Int. Cl.
*A63F 13/12* (2006.01)
(52) U.S. Cl. ................ 463/3; 463/7; 463/37; 463/50; 463/53; 273/317.1; 273/317.4; 273/406; 273/461; 340/323 R; 340/323 B; 377/5; 473/459; 473/504
(58) Field of Classification Search .................. 463/2–8, 463/16, 20, 23, 30–32, 34, 36–37, 40–43, 463/46–47, 50, 53, 56, 58–69; 273/108.1, 273/108.3, 108.4, 150, 317.1, 317.3, 317.4, 273/317.5, 317.6, 359, 329–330, 406–407, 273/440.1, 460–461; 340/323 R, 323 B; 377/4–5; 446/415; 473/451, 459, 468, 498–499, 473/504, 564–565, 598, 600, FOR. 102, FOR. 135, 473/FOR. 169, FOR. 192; *A63F 13/12*
See application file for complete search history.

(56) References Cited

U.S. PATENT DOCUMENTS

| | | | | |
|---|---|---|---|---|
| 5,390,937 A | * | 2/1995 | Sakaguchi et al. | 463/7 |
| 5,601,487 A | * | 2/1997 | Oshima et al. | 463/4 |
| 5,846,086 A | * | 12/1998 | Bizzi et al. | 434/247 |
| 5,890,906 A | * | 4/1999 | Macri et al. | 434/247 |
| 6,104,864 A | * | 8/2000 | Kondo et al. | 386/117 |
| 6,146,269 A | * | 11/2000 | Morihira | 463/8 |
| 6,152,821 A | * | 11/2000 | Nakagawa et al. | 463/4 |
| 6,168,519 B1 | * | 1/2001 | Nakagawa et al. | 463/4 |
| 6,171,186 B1 | * | 1/2001 | Kurosawa et al. | 463/31 |
| 6,210,273 B1 | * | 4/2001 | Matsuno | 463/8 |
| 6,217,446 B1 | * | 4/2001 | Sanbongi et al. | 463/7 |
| 6,244,956 B1 | * | 6/2001 | Nakayama et al. | 463/3 |

(Continued)

FOREIGN PATENT DOCUMENTS

JP    2003-175282    6/2003

(Continued)

*Primary Examiner* — Arthur O. Hall
(74) *Attorney, Agent, or Firm* — Nixon & Vanderhye P.C.

(57) ABSTRACT

A game system moves a player character in a virtual game space in accordance with an operation by a player. Further, the player character's moving amount per predetermined unit time is detected at each predetermined time interval. A predetermined parameter (gage amount) value is calculated at each predetermined time interval based on the moving amount detected at each predetermined time interval. Also, the game system adds the predetermined parameter value calculated at each predetermined time interval for accumulation. In response to a predetermined operation performed by the player, the game system causes the player character to perform a predetermined motion (e.g., special shot) on a condition such that a value obtained as a result of the addition reaches a predetermined value.

15 Claims, 9 Drawing Sheets

U.S. PATENT DOCUMENTS

| | | | |
|---|---|---|---|
| 6,347,993 B1 * | 2/2002 | Kondo et al. | 463/1 |
| 6,354,940 B1 * | 3/2002 | Itou et al. | 463/8 |
| 6,373,897 B1 * | 4/2002 | Taniguchi | 375/240.21 |
| 6,394,896 B2 * | 5/2002 | Sugimoto | 463/3 |
| 6,428,411 B1 * | 8/2002 | Togami | 463/4 |
| 6,503,144 B1 * | 1/2003 | Rimoto et al. | 463/4 |
| 6,917,356 B1 * | 7/2005 | Nishiumi et al. | 345/161 |
| 6,962,527 B2 * | 11/2005 | Baba | 463/4 |
| 6,972,766 B2 * | 12/2005 | Nagayama | 345/473 |
| 7,059,963 B2 * | 6/2006 | Okamura et al. | 463/3 |
| 7,204,758 B2 * | 4/2007 | Tsuchida et al. | 463/43 |
| 7,740,532 B2 * | 6/2010 | Namba et al. | 463/4 |
| 2002/0142848 A1 * | 10/2002 | Tsuchida et al. | 463/43 |
| 2004/0209680 A1 * | 10/2004 | Oyamada et al. | 463/31 |

FOREIGN PATENT DOCUMENTS

| | | |
|---|---|---|
| JP | 2003-205171 | 7/2003 |
| JP | 2003-265859 | 9/2003 |

* cited by examiner

Fig. 4

GAGE AMOUNT CORRECTION TABLE BASED ON PLAYER CHARACTER

| TYPE OF PLAYER CHARACTER | CORRECTION FACTOR |
|---|---|
| PLAYER CHARACTER A | 0.8 |
| PLAYER CHARACTER B | 1.0 |
| PLAYER CHARACTER C | 1.2 |

Fig. 5

GAGE AMOUNT CORRECTION TABLE BASED ON SCORE DIFFERENCE

| SCORE DIFFERENCE | CORRECTION FACTOR H |
|---|---|
| LEADS FIVE GAMES | 0.5 |
| LEADS FOUR GAMES | 0.6 |
| LEADS THREE GAMES | 0.7 |
| LEADS TWO GAMES | 0.8 |
| LEADS ONE GAMES | 0.9 |
| NO GAME DIFFERENCE | 1.0 |
| LED BY ONE GAME | 1.1 |
| LED BY TWO GAMES | 1.2 |
| LED BY THREE GAMES | 1.3 |
| LED BY FOUR GAMES | 1.4 |
| LED BY FIVE GAMES | 1.5 |

GAME SYSTEM AND STORAGE MEDIUM FOR STORING GAME PROGRAM

BACKGROUND OF THE INVENTION

1. Field of the Invention

The present invention relates to a game system and a storage medium storing a game program, more particularly, relates to a game system for executing a sport game in which a player character and an opponent character rally an object to be hit, such as a ball, within a virtual game space, and a storage medium storing a game program.

2. Description of the Background Art

Conventionally, in a sport game or the like, a game in which a gage indicating a condition of a player character is set such that the player character can perform a special technique depending on the amount of gage has been devised (for example, see patent document 1 (Japanese Laid-Open Patent Publication No. 2003-175282)). In a tennis game as disclosed in patent document 1, a gage indicates a mental or physical condition of a player, and the gage amount is increased or reduced based on the improvement or deterioration of the player's condition. When a necessary gage amount is accumulated, it is possible to cause the player character to perform a special technique which is stronger than a normal shot. In patent document 1, when a tennis player (player character) is mentally and physically up to the mark, the tennis player can make a strong shot, whereby a game player can experience the thrill peculiar to an actual sport and enjoy the game to the fullest.

Also, an example of a conventional game using a gage is disclosed in patent document 2 (Japanese Laid-Open Patent Publication No. 2003-205171) and patent document 3 (Japanese Laid-Open Patent Publication No. 2003-265859), for example. The patent document 2 discloses a tennis game, in which a gage having a shape according to a shot motion of a character is displayed for confirmation of the character's shot motion based on its shape. Also, the patent document 3 discloses a baseball game, in which a gage amount is increased, when a ball is caught in response to a depressing operation for a button by a game player, in accordance with a time elapsed after the depression of the button by the game player. The gage displays a plurality of lines, and the game apparatus controls where and how the ball is thrown depending on a line which the gage amount exceeds when the game player releases the depression of the button. This gage is used for displaying a player's depressing time of the button in an easily understood manner. Note that the games as disclosed in patent documents 2 and 3 employ a gage for a clearly visible display of a player's operation. However, this gage is not used as an index for causing a player character to perform a special action (i.e., above-described special technique).

In the game as disclosed in patent document 1, a gage amount is accumulated every time a criterion defined for each player character is satisfied. For example, a certain player character satisfies his/her criterion when getting a score by a specific shot. Such a criterion indicates a personal quality of each player character, but it is irrelevant to the game skill of the player. Thus, an experienced game player who is thoroughly familiar with such a criterion can accumulate a gage amount pretty quickly, and perform special technique at relatively frequent intervals. On the other hand, an inexperienced game player finds it difficult to perform a special technique due to the difficulty of accumulating a gage amount. That is, in the conventional game, due to the difficulty of performing a special technique, an inexperienced game player is not allowed to enjoy performing a special technique.

SUMMARY OF THE INVENTION

Therefore, an object of the present invention is to provide a game system allowing an inexperienced game player to accumulate a gage amount with relative ease, and a storage medium storing a game program.

The present invention has the following features to attain the object mentioned above (notes in parentheses indicate exemplary elements which can be found in the embodiments to follow, though such notes are not intended to limit the scope of the invention).

A first aspect of the present invention is directed to a game system (10) for executing a sport game (tennis gage) in which a player character (102) and an opponent character (104) rally a hit object (ball object 107) in a virtual game space. The game system comprises: movement control means (CPU 36, for example, for executing step S6; hereinafter only a step number is shown); moving amount detection means (S8); parameter calculation means (S9); addition means (S19); and motion control means (S41 and S45). The movement control means moves the player character in the virtual game space in accordance with an operation by a player. The moving amount detection means detects the player character's moving amount per predetermined unit time at each predetermined time interval. The parameter calculation means calculates a predetermined parameter (gage amount) value at each predetermined time interval based on the moving amount detected at each predetermined time interval by the moving amount detection means. The addition means adds the predetermined parameter value calculated at each predetermined time interval (frame time) by the parameter calculation means for accumulation. The motion control means causes the player character to perform a predetermined motion (special shot), in response to a predetermined operation performed by the player, on a condition such that a value obtained as a result of the addition by the addition means reaches a predetermined value.

According to a second aspect, the game system may further comprise score calculation means (S27); score difference calculation means (S11); and first correction means (S13). The score calculation means calculates scores of the player character and the opponent character. The score difference calculation means calculates a difference between the scores of the player character and the opponent character. The first correction means corrects the predetermined parameter value calculated by the parameter calculation means based on the score difference calculated by the score difference calculation means. In this case, the addition means adds the predetermined parameter value corrected by the first correction means to the current addition results.

According to a third aspect, the first correction means may correct the predetermined parameter value in such a manner that the greater a value obtained by subtracting the score of the opponent character from the score of the player character is, the smaller the predetermined parameter value becomes.

According to a fourth aspect, the game system may further comprise rally determination means (S7). The rally determination means determines, at each predetermined time interval, whether or not a rally is continued. In this case, the moving amount detection means detects the moving amount only when the rally determination means determines that a rally is continued.

A fifth aspect of the present invention is directed to a game system for executing a sport game in which a player character and an opponent character rally a hit object in a virtual game space. The game system comprises waiting decision means (S61); waiting time measurement means (S63); hitting execution means (S67); parameter calculation means (S71); addition means (S17); and motion control means (S41 and S45). The waiting decision means decides, when an operation for causing the player character to perform a hitting motion (normal shot motion) is performed by a player, whether the hitting motion is performed immediately or postponed, based on relative positions of the player character and the hit object. The waiting time measurement means measures a waiting time of the hitting motion when the waiting decision means decides that the hitting motion is postponed. The hitting execution means causes the player character to perform a hitting motion having a strength corresponding to a length of the waiting time measured by the waiting time measurement means when the waiting decision means decides that the hitting motion is performed. The parameter calculation means calculates a predetermined parameter (gage amount) value based on a waiting time in such a manner that the shorter the waiting time measured by the waiting time measurement means, the greater the predetermined parameter value. The addition means adds the predetermined parameter value calculated by the parameter calculation means for accumulation. The motion control means causes the player character to perform the predetermined motion (special shot), in response to a predetermined operation performed by the player, on a condition such that a value obtained as a result of the addition by the addition means reaches a predetermined value.

According to a sixth aspect, the game system may further comprise gage amount display means (S19). The gage amount display means displays a gage (108*a*, 108*b*, 109*a*, 109*b*) indicating a value, which is obtained as a result of the addition by the addition means, in a position which is determined with respect to the player character.

According to a seventh aspect, the game system may further comprise character selection means (S3) and second correction means (S13). The character selection means selects any one player character from among a plurality of types of player characters. The second correction means corrects th predetermined parameter value calculated by the parameter calculation means by a correction factor which is previously set in accordance with a type of the player character selected by the character selection means.

Note that the present invention may be provided in the form of a storage medium which stores a game program for causing a computer of the game system to function as the above-described means.

According to the first aspect, it is possible to accumulate a parameter used for performing a predetermined motion in accordance with the moving amount of the player character. In a sport game in which the player character and the opponent character rally a ball, etc., in the virtual game space, it is conceivable that an inexperienced game player often moves the player character more than necessary. Thus, even a beginning game player can perform a special technique such as a special shot which is enabled only when a certain parameter is accumulated, whereby he/she can fully enjoy the game.

According to the second aspect, the gage amount is corrected based on a score difference, whereby it is possible to set the degree of increase of the gage amount in accordance with the score difference.

According to the third aspect, the wider the margin of a score difference with which a player character leads an opponent player character, the smaller the gage amount. On the other hand, the wider the margin of a score difference with which the player character is led by the opponent player character, the greater the gage amount. Thus, the more disadvantaged situation a player is, the more quickly he/she can accumulate the gage, thereby performing a special action. As a result, it is possible to realize a heated seesaw match by preventing one game player from leaving the other game player at a one-sided disadvantage in a match-up game.

According to the fourth aspect, a movement of the player character other than a movement during a rally is irrelevant to the increase of a parameter. A movement of the player character is correlated with the game skill only when a rally is performed. For example, an operation for moving the player character before serving is irrelevant to the game skill. Thus, it is possible to ensure that the game skill is reflected in a parameter value in a more accurate manner by detecting a movement of the player character only when a rally is performed.

According to the fifth aspect, it is possible to accumulate a parameter used for performing a predetermined motion in accordance with a waiting time elapsed before the player character performs a hitting motion. In a sport game in which the player character and the opponent character rally a ball, etc., in the virtual game space, it is conceivable that the more inexperienced a game player is, the shorter a waiting time is. Thus, even a beginning game player can perform a special technique such as a special shot, which is allowed to perform only when an enough parameter is accumulated, whereby he/she can fully enjoy the game.

According to the sixth aspect, the accumulated gage amount is displayed in connection with the player character. Thus, the player can check the gage amount with ease while operating the player character.

According to the seventh aspect, it is possible to select a player character from among a plurality of types of characters, and change the degree of increase of the gage amount in accordance with the selected player character.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an illustration showing an exemplary gage amount correction table based on a player character;

FIG. 5 is an illustration showing an exemplary gage amount correction table based on a score difference;

DESCRIPTION OF THE PREFERRED EMBODIMENTS

Hereinafter, a game executed by a game system and a game program according to one embodiment of the present invention will be described by taking a tennis game performed in a virtual game space (hereinafter simply referred to as a game space) as an example.

Figure 1:
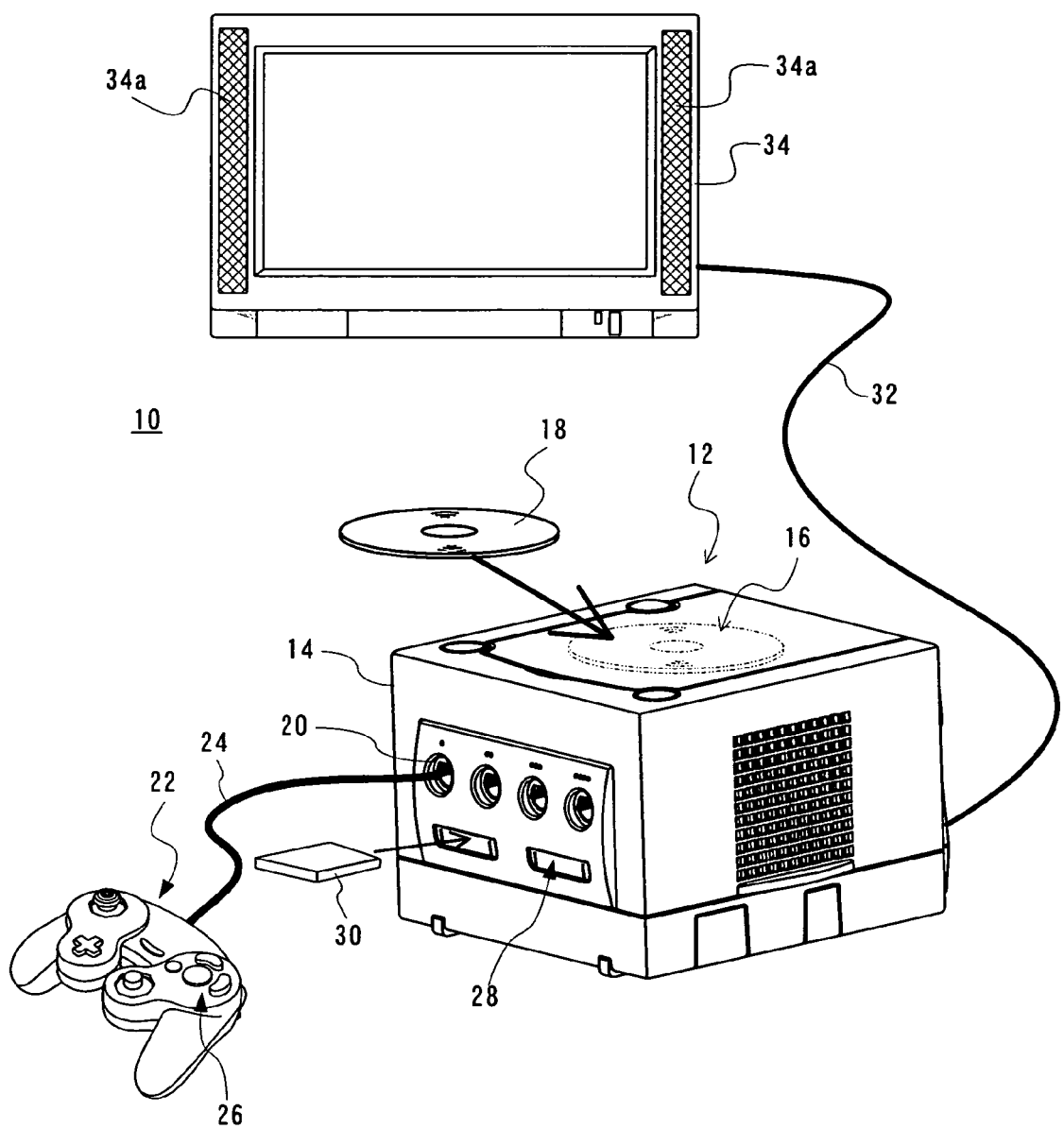
FIG. 1 is an external view of an exemplary video game system according to one embodiment of the present invention.

A video game system 10 according to the present embodiment as shown in FIG. 1 includes a video game apparatus or a video game machine 12 (hereinafter simply referred as a "game machine"). In this embodiment, a power supply for applying power to this game machine 12 may be a commonly-used AC adapter (not shown). The AC adapter is inserted into a standard wall socket for household purposes, and converts power for domestic use to a lower DC voltage signal suitable for driving the game machine 12. In other embodiments, a battery may be used as a power supply.

The game machine 12 includes a housing 14 which is in the shape of a generally regular hexahedron. On the top surface of the housing 14, an optical disk drive 16 is provided. An optical disk 18, which is one example of an information storage medium storing a game program (image processing program), is mounted on the optical disk drive 16. A plurality of (in this embodiment, four) connectors 20 are provided on the front surface of the housing 14. Each of these connectors 20 connects a controller 22 to the game machine 12 by using a cable 24. In this embodiment, the game machine 12 can be connected up to four controllers.

Operation means (control) are provided on the upper, lower, or side surface of the controller 22. The operation means 26 includes two analog joysticks, one cross switch, and a plurality of button switches. One of the analog joysticks is used for inputting a moving direction and/or a moving speed or a moving amount of a player character (a moving image character operable by a player with the controller 22), which is an object to be operated, based on a tilt amount and an orientation of the stick. The other analog joystick controls a movement of the player character, for example, based on a tilt orientation thereof in a similar manner. The cross switch is used as an alternative to the analog joystick for instructing a moving direction of the player character. The button switch is used for instructing a movement of the player character, or adjusting a moving speed of the player character, for example. The button switch controls, for example, menu selection or a movement of a pointer or a cursor.

Note that, in this embodiment, the controller 22 is connected to the game machine 12 by using the cable 24. However, the controller 22 may be connected to the game machine 12 by another method, for example, in a wireless manner via electromagnetic waves (e.g., electric waves or infra-red rays). Also, it will be understood that the concrete structure of the operation means of the controller 22 is not limited to the present embodiment, and arbitrary variations may be possible. For example, only one or no analog joystick may be used. Also, no cross switch may be used.

At least one (in this embodiment, two) memory slot 28 is provided in a portion below the connector 20 on the front surface of the housing 14 of the game machine 12. A memory card 30 is inserted into the memory slot 28. The memory card 30 is used for temporarily storing a game program or data read from the optical disk 18, and saving game data (e.g., game results) of a game played by utilizing the game system 10.

An AV cable connector (not shown) is provided on the back surface of the housing 14 of the game machine 12. A monitor 34 (display) is connected to the game machine 12 via an AV cable 32 by using the AV cable connector. The monitor 34 is typically a color television receiver. The AV cable 32 inputs a video signal from the game machine 12 to a video input terminal of the color television, and provides an audio signal to an audio input terminal. Thus, a game image of a three-dimensional (3D) video game, for example, is displayed on a screen of the color television 34 (monitor), whereas a game sound (e.g., stereo) such as a game music (BGM) or a sound effect is outputted from right and left loudspeakers 34a.

In this game system 10, a user or a game player first sets the optical disk 18 on the game machine 12, turns on the game machine 12, and loads the optical disk 18 into the optical disk drive 16 of the game machine 12 in order to play a game (or other applications). In response thereto, the game machine 12 starts executing a video game or other applications based on software stored in the optical disk 18. The user operates the controller 22 for performing an input for the game machine 12. For example, the user starts the game or other applications by operating any of the operation means 26. By moving the other operation means 26, the user can select a desired player character from among a plurality of player characters (player objects), and cause the selected player character to move in different directions.

Figure 2:
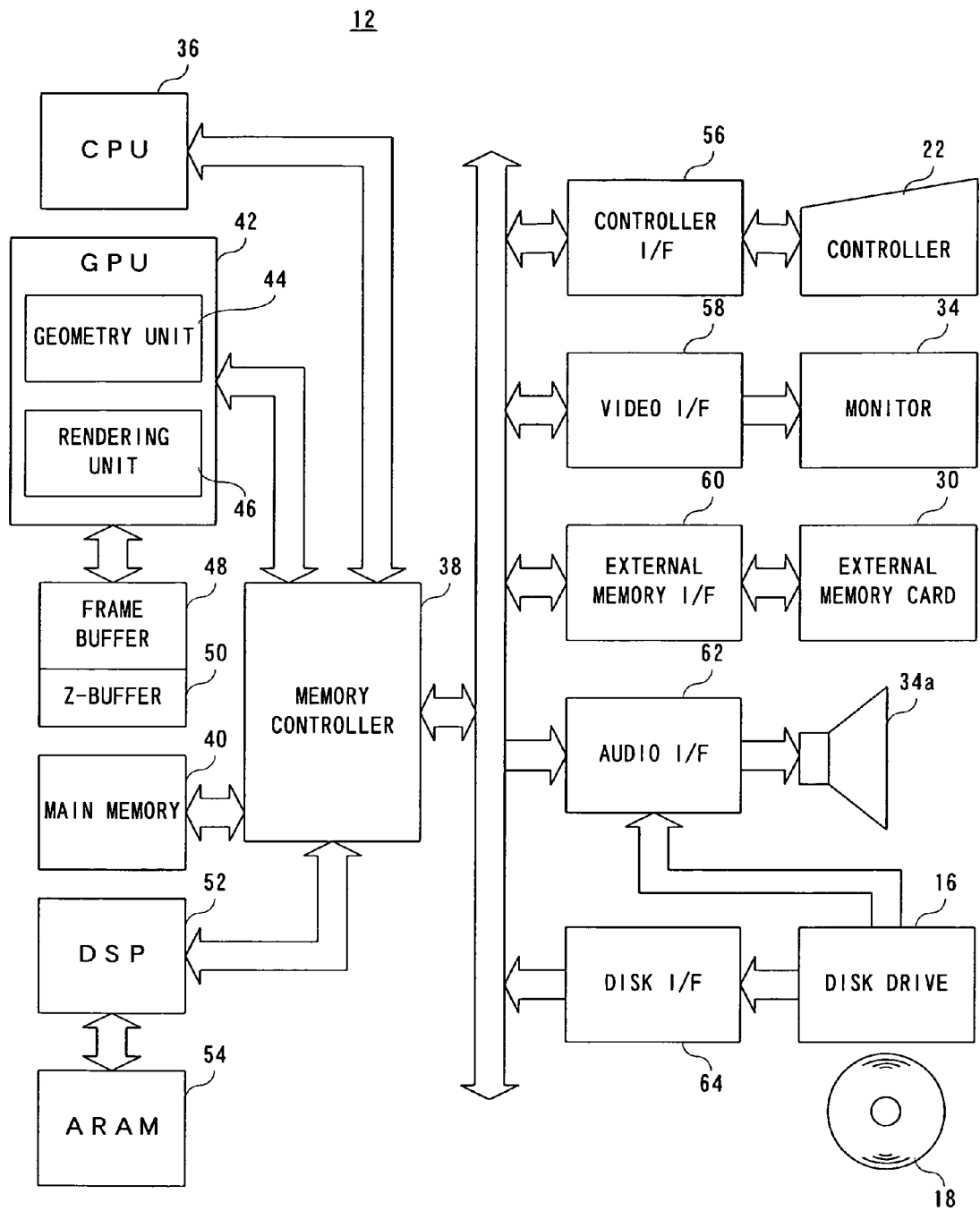
FIG. 2 is a block diagram showing an electrical structure of a game apparatus of the present embodiment.

FIG. 2 is a block diagram showing an electrical inner structure of the video game system 10 of the present embodiment as shown in FIG. 1. A central processing unit 36 (hereinafter referred to as a "CPU") is provided in the video game machine 12. The CPU 36 can be referred to as a computer or a processor, and performs overall control of the game machine. The CPU 36 or the computer, which functions as a game processor, is connected to a memory controller 38 via a bus. Under the control of the CPU 36, the memory controller 38 mainly controls writing and reading performed by a main memory 40 to which the memory controller 38 is connected via a bus. The main memory 40 is used as a work area or a buffer area. A GPU 42 (Graphics Processing Unit) is connected to the memory controller 38.

The GPU 42 is one component element of rendering means, and is implemented by a single chip ASIC, for example. The GPU 42 receives a graphics command from the CPU 36 via the memory controller 38, and causes a geometry unit 44 and a rendering unit 46 to generate a three-dimensional (3D) game image in accordance with the received command. That is, the geometry unit 44 performs a coordinate calculation processing such as rotation, displacement, and transformation of various characters and objects (each of which consists of a plurality of polygons; a polygon refers to a polygonal plane defined by at least three vertex coordinates) in a three-dimensional coordinate system. The rendering unit 46 performs rendering processing such as texture mapping for mapping a texture to each polygon of each object. Thus, the GPU 42 generates, from a three-dimensional model, three-dimensional data to be displayed on the game screen. The generated image data is rendered (stored) to the frame buffer 48.

Note that the GPU 42 obtains data (e.g., a primitive or a polygon and a texture) necessary for executing a graphics generating command from the main memory 40 via the memory controller 38.

The frame buffer 48 is a memory for rendering (accumulating) image data corresponding to one frame of a raster scan monitor 34, for example, and is rewritten by the GPU 42 on a frame-by-frame basis. When a video I/F 58 (described below) reads data from the frame buffer 48 via the memory controller 38, a game image is displayed on the screen of the monitor 34. Note that the capacity of the frame buffer 48 depends on the number of pixels (or dots) of the screen on which an image to be displayed. For example, the frame buffer 48 has the number of pixels (a storage position or an address) corresponding to the number of pixels of the display or the monitor 34.

Also, a Z-buffer 50 has the capacity corresponding to the number of pixels (a storage position or an address) corresponding to the frame buffer 48 multiplied by the number of bits of depth data per one pixel. The Z-buffer 50 stores depth information or depth data (Z value) of a dot corresponding to each storage position of the frame buffer 48.

Note that both the frame buffer 48 and the Z-buffer 50 may be implemented by using a portion of the main memory 40.

The memory controller 38 is also connected to a submemory 54 (ARAM) via a DSP 52 (Digital Signal Processor). Thus, under the control of the CPU 36, the memory controller 38 controls writing and/or reading performed not only by the main memory 40 but also by the ARAM 54.

The DSP 52 functions as a sound processor, for example, and executes an audio processing task. The ARAM 54 can be used as an audio memory for storing sound waveform data (sound data), for example. The DSP 52 receives an audio processing command from the CPU 36 via the memory controller 38, and extracts necessary sound waveform data in accordance with the received command, thereby performing processing/mixing such as pitch modulation and mixing of audio data and sound effect data, for example. An audio processing command is generated by sequentially reading and analyzing musical performance control data (sound data), for example, written to the main memory 40 through the execution of a sound processing program, etc. The sound waveform data is sequentially read, and processed by the DSP 52 for generating game audio contents. The resulting generated contents or audio output data is buffered, for example, by the main memory 40, and transferred to an audio I/F 62 so as to be outputted from the loudspeaker 34*a* as a stereophonic sound, for example. The resulting sound is outputted from the loudspeaker 34*a*.

Note that the generated audio data is not limited to playback in 2ch stereo sound. It will be appreciated that the generated audio data can be applied to playback, for example, in 5.1ch, 6.1ch, or 7.1ch surround sound, or playback in monaural sound.

The memory controller 38 is further connected to various interfaces (I/F) 56, 58, 60, 62, and 64 via a bus.

The controller I/F 56, which is an interface for the controller 22, provides an operation signal or data from the operation means 26 of the controller 22 to the CPU 36 via the memory controller 38.

The video I/F 58 accesses the frame buffer 48, reads image data generated by the GPU 42, and provides an image signal or image data (digital RGB pixel value) to the monitor 34 via the AV cable 32 (FIG. 1).

The external memory I/F 60 interfaces between the memory card 30 (FIG. 1) inserted to the front surface of the game machine 12 and the memory controller 38. As a result, the CPU 36 can write/read data to/from the memory card 30 via the memory controller 38.

The audio I/F 62 receives audio data provided by the buffer or an audio data stream read from the optical disk 18 via the memory controller 38, and provides a corresponding audio signal (sound signal) to the loudspeaker 34*a* of the monitor 34.

Note that, in case of a stereophonic sound, at least right and left loudspeakers 34*a* are provided. Also, in case of playback in surround sound, aside from the loudspeaker 34*a* of the monitor 34, additional five loudspeakers and one bass loudspeaker (in case of playback in 7.1ch surround sound) may be provided via an AV amplifier, for example.

The disk I/F 64 interfaces between the optical disk drive 16 and the memory controller 38. In other words, the CPU 36 controls the optical disk drive 16. Under the control of the CPU 36, program data and object data, texture data, and sound data, etc., read from the optical disk 18 by the optical disk drive 16 are written to the main memory 40.

Figure 3:
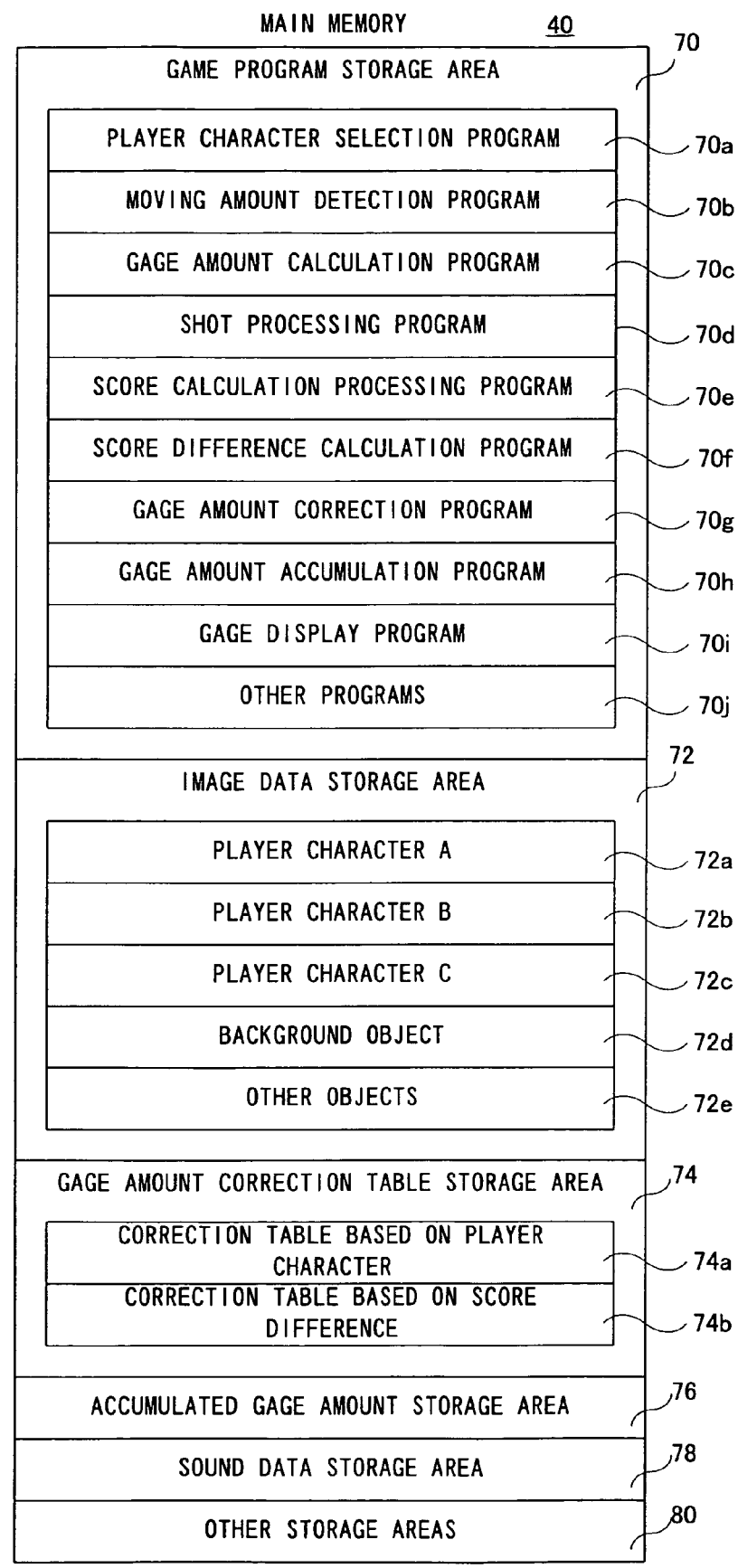
FIG. 3 is an illustration showing an exemplary memory map of a main memory as shown in FIG. 2.

FIG. 3 illustrates a memory map of the main memory 40. The main memory 40 includes a game program storage area 70, an image data storage area 72, a gage amount correction table storage area 74, an accumulated gage amount storage area 76, a sound data storage area 78, and a various other data storage area 80.

The game program storage area 70 stores the entire of the game program read from the optical disk 18 at one time, or stores a portion thereof in a sequential manner. In accordance with the read game program, the CPU 36 executes game processing. In this embodiment, the game program includes a player character selection program 70*a*, a moving amount detection program 70*b*, a gage amount calculation program 70*c*, a shot processing program 70*d*, a score calculation processing program 70*e*, a score difference calculation program 70*f*, a gage amount correction program 70*g*, a gage amount accumulation program 70*h*, a gage display program 70*i*, and various other programs 70*j* necessary for the progress of the game.

The player character selection program 70*a* is a program for selecting a player character appearing and playing in the virtual three-dimensional space. Note that, in the present embodiment, it is assumed that one character is selected from among a plurality of types of characters as a player character before a tennis game is started.

The moving amount detection program 70*b* is a program for detecting the moving amount of the player character when the player operates the operation means 26 in order to move the player character. As a method for detecting the moving amount of the player character, it is conceivable that a change in position coordinates of the player character is detected on a predetermined unit time (one frame or few frames) basis, for example, so as to detect the moving amount based on the amount of change in coordinates Also, in the case where the moving amount of the player character is increased in proportion to the operation time of the operation means 26 (a tilt operation of the analog joystick or a depressing operation of the cross switch), the operation time of the operation means 26 may be detected so as to determine the moving amount depending on the detected operation time.

The gage amount calculation program 70*c* is a program for calculating a gage amount based on the moving amount detected by the moving amount detection program 70*b*. A gage amount represents a parameter providing an indicator whether the player character can perform a special action. That is, only when the gage amount reaches the maximum value (i.e., only when the gage is filled to capacity), the player character can perform a special action. Specifically, in the present embodiment, a special action refers to a special shot. A special shot has an effect distinct from that of a normal shot, and includes a shot by which a hit ball goes faster than a normal shot, or a shot by which a ball can be returned from a position where return is impossible under normal circumstances.

The gage amount calculated by the gage amount calculation program 70*c* represents an increasing amount of gage, i.e., the gage amount to be increased from the current gage amount. In other words, a new gage amount is obtained by increasing the current gage amount by the gage amount calculated by the gage amount calculation program 70*c*. Thus, hereinafter, the gage amount calculated by the gage amount calculation program 70*c* may be referred to as an increasing amount of gage (increasing gage amount).

The shot processing program 70*d* is a program for causing the player character to perform, in response to a shot instruction issued to the player character by the player with the operation means 26, a shot motion corresponding to the shot instruction. For example, when the player gives a normal shot instruction, the shot processing program 70*d* causes the player character to perform a normal shot motion (normal action). On the other hand, when the player gives a special shot instruction, the shot processing program 70*d* causes the player character to perform a special shot motion (special action).

The score calculation processing program 70*e* is a program for calculating a score of the player character or its opponent character when the score is increased due to an effective shot by the player character or the opponent character or due to a mistake in either player's shot, for example.

The score difference calculation program 70*f* is a program for calculating a difference in scores of the player character and the opponent character.

The gage amount correction program 70*g* is a program for correcting the increasing gage amount (the gage amount to be increased) calculated based on the moving amount of the player character in accordance with the type of the selected player character or a score difference. For example, in the case where the correction is performed based on a score difference, the gage amount correction program 70*g* corrects the increasing gage amount in such a manner that the greater the score of the player character compared to that of the opponent character (i.e., when the player character leads the opponent character), the smaller the increasing gage amount becomes. On the other hand, the gage amount correction program 70*g* corrects the increasing gage amount in such a manner that the greater the score of the opponent character compared to that of the player character (i.e., when the opponent character leads the player character), the greater the increasing gage amount becomes.

The gage amount accumulation program 70*h* is a program for accumulating the increasing gage amount calculated based on the moving amount (or the corrected increasing gage amount). Specifically, the gage amount accumulation program 70*h* adds the increasing gage amount corrected by the gage amount correction program 70*g* to the current gage amount so as to obtain a new gage amount.

The gage display program 70*i* is a program for displaying the gage amount in connection with the player character (in a position which is determined with respect to the player character). For example, in this embodiment, the player character has a racket object with its hand, and a gage is displayed around the racket object.

The image data storage area 72 stores character A data 72*a*, character B data 72*b*, character C data 72*c*, background object data 72*d*, and various other object data 72*e*, for example. The character A data 72*a*, the character B data 72*b*, and the character C data 72*c* are data of a plurality of types of characters selected and operated by the player. Each character is composed of polygons. Each data contains, for example, information regarding position coordinates and a condition of each character. The background object data 72*d* includes data regarding a court object and an audience object. The various other object data 72*e* includes object data regarding a racket object and a ball object held by the player character and the opponent character.

The gage amount correction table storage area 74 stores a gage amount correction table 74*a* based on the player character and a gage amount correction table 74*b* based on the score difference. The accumulated gage amount storage area 76 stores the gage amount (accumulated gage amount) obtained as a result of accumulation of the increasing gage amount (or corrected increasing gage amount) calculated based on the moving amount of the player character. The sound data storage area 78 stores sound data regarding a BGM and a sound effect of the game. The various other data storage area 80 stores various other data and flags, for example, necessary for the progress of the game, such as score data of the player character and the opponent character.

The entire of each data is loaded from the optical disk 18 at one time into the image data storage area 72, the gage amount correction table storage area 74, the sound data storage area 78, and the like, of the main memory 40. Alternatively, a portion of each data is sequentially loaded, as necessary, from the optical disk 18 into the image data storage area 72, the gage amount correction table storage area 74, the sound data storage area 78, and the like, of the main memory 40.

FIG. 4 illustrates one example of the gage amount correction table 74*a*, which is based on the player character, stored in the gage amount correction table storage area 74. As shown in FIG. 4, the gage amount correction table 74*a* based on the player character is a table for setting a correction factor, which varies according to the type of the selected player character. For example, in the case where the player character A is selected, a correction factor of the increasing gage amount is set to 0.8. That is, the increasing gage amount calculated based on the moving amount of the player character A is corrected to a value obtained by multiplying the calculated increasing gage amount by 0.8 (i.e., 80% of the calculated increasing gage amount). Similarly, in the case where the character B is selected, a correction factor of the increasing gage amount is set to 1.0. In the case where the player character C is selected, a correction factor of the increasing gage amount is set to 1.2. As such, it is possible to realize a more challenging and interesting match-up game by changing a correction factor of the increasing gage amount according to the type of the player character.

FIG. 5 illustrates one example of the gage amount correction table 74*b* based on the score difference stored in the gage amount correction table storage area 74. As shown in FIG. 5, the gage amount correction table 74*b* based on the score difference is a table for setting a correction factor, which varies according to how many games the player character leads the opponent character, or how many games the player character is led by the opponent character. For example, in the case where the player character leads the opponent character by five games, a correction factor of the increasing gage amount is set to 0.5. As a result, when the player character leads the opponent character by five games, the increasing gage amount to be accumulated is corrected to 50% of the increasing gage amount calculated based on the moving amount. Similarly, a correction factor becomes greater as the number of games by which the player character leads the opponent character is reduced. When there is no difference in number of games between the player character and the opponent character, a correction factor becomes 1.0 (100% of the calculated increasing gage amount). Also, in the case where the player character is led by the opponent character by one game, a correction factor of the increasing gage amount is set to 1.1. As such, a correction factor becomes greater as the number of games by which the player character is led by the opponent character is increased. When the player character is led by the opponent character by five games, a correction factor becomes 1.5.

In the above example as shown in FIG. 5, the greater the score difference by which a character leads its opponent character, the smaller a correction factor of the increasing gage amount; the greater the score difference by which a character is led by its opponent character, the greater a correction factor of the increasing gage amount. That is, even when characters are moved by the same amount, an advantaged player leading his/her opponent player accumulates a smaller gage amount. As a result, it takes a long time for the leading player to accumulate the gage amount enough for performing a special shot. On the other hand, a disadvantaged player led by his/her opponent player can accumulate a large amount of gage, thereby accumulating the gage amount enough for performing a special shot in a short time. Thus, it is possible to give a disadvantaged player an edge over his/her opponent player, and prevent one of the players from leading the other player by a wide margin. As a result, it is possible to realize a seesaw game which triggers an adequate feeling of tension among the players.

In a tennis game, when a player takes four points (one point is the smallest unit of scoring) first, the player gets one game, and the player will be a winner of the set if he/she takes six games first. In the case where the game rules state a three set match, a player who takes two sets first comes off a winner. In the example as shown in FIG. 5, it is assumed that a correction factor is set based on the game difference, but it is not limited thereto. A correction factor may be set based on a point difference or a set difference. Alternatively, a correction factor may be set based on a combination of two or more of a point difference, a game difference, and a set difference.

Figure 6:
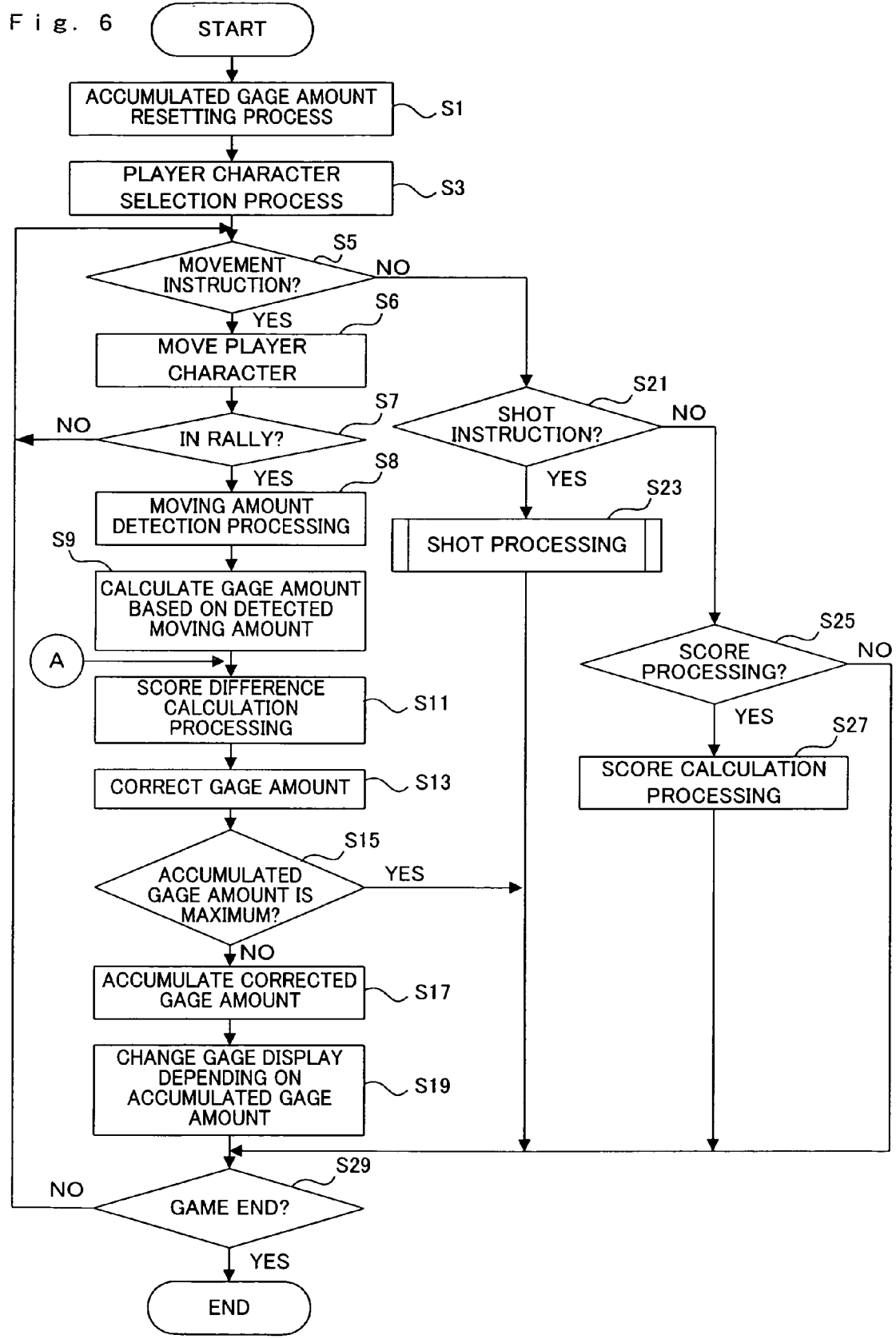
FIG. 6 is a flowchart showing an exemplary game operation of the game apparatus of the present embodiment.

FIG. 6 illustrates one example of a game operation of the game machine 12. As aforementioned, when the optical disk 18 is set on the game machine 12 in order to play the game, and the game machine 12 is turned on, the CPU 36 performs reset processing of the accumulated gage amount storage area 76 of the main memory 40 at step S1, which is a first step of FIG. 6. Specifically, the CPU 36 sets the accumulated gage amount stored in the accumulated gage amount storage area 76 to zero.

Next, at step S3, the CPU 36 executes player character selection processing. For example, the CPU 36 separately or collectively displays the character A, the character B, and the character C stored in the image data storage area 72 of the main memory 40, and displays a selection screen on the monitor 34 to urge the player to select his/her desired character. When the player selects any of the characters by operating the operation means 26, the CPU 36 determines the selected player character as a player character to be used in the game, and displays the determined player character in the virtual space.

Next, at step S5, the CPU 36 determines whether or not a movement of the player character is instructed. For example, the CPU 36 determines whether or not the player instructs a movement of the player character by performing a tilt operation with the analog joystick included in the operation means 26 or a depressing operation with the cross switch.

In the case where determination at step S5 is "YES", i.e., in the case where the player performs an operation for moving the player character, the CPU 36 moves the player character in accordance with the player's operation at step S6. At the following step S7, the CPU 36 determines whether or not a rally is continued when the movement is instructed. Here, a rally refers to a time period from when any of the characters playing tennis serves to when a point is scored. At step S7, specifically, a flag which is turned ON when any of the characters serves and is turned OFF when a point is scored is prepared, and the CPU 36 may determine that a rally is continued when the flag is turned ON. The above-described main processing routine is executed on a unit time basis (e.g., every one frame). Thus, step S7 as well as steps S8 and S9, which will be described below, is executed on a unit time basis. In the case where determination at step S7 is "NO", i.e., in the case where a rally is not continued, processing at step S5 is repeated.

On the other hand, in the case where determination at step S7 is "YES", i.e., in the case where a rally is continued, the CPU 36 performs moving amount detection processing for the player character at step S8. Specifically, the CPU 36 detects a change in the position coordinates of the player character in a predetermined unit time (e.g., one frame), calculates the amount of coordinate change, and sets the calculated amount of coordinate change as a moving amount. For example, in the case where the position coordinates of the player character are changed from (X1, Y1) to (X2, Y2), the amount of coordinate change (moving amount) M is obtained by the following equation (1).

$$M = \sqrt{(X2-X1)^2 + (Y2-Y1)^2} \tag{1}$$

As another example of the moving amount detection processing, it is conceivable that a moving amount is obtained by detecting an operation time during which the player operates the operation means 26 to instruct the movement of the player character (a time period in which the analog joystick is tilted or the cross switch is depressed). In this case, a value of the detected operation time can be used as a moving amount.

At the following step S9, the increasing gage amount is calculated based on the moving amount M detected at step S7. For example, a value obtained by multiplying the moving amount M by a predetermined numeric value is set as the increasing gage amount. Specifically, the increasing gage amount is calculated by the following equation (2).

$$(\text{increasing gage amount}) = (\text{moving amount } M \text{ of player character})/3. \tag{2}$$

Note that a unit of the moving amount M of the player character is a predetermined unit defined in the game space. In this embodiment, it is assumed that the increasing gage amount is calculated by using the above equation (2), but it is not limited thereto. In other embodiments, the increasing gage amount corresponding to the moving amount M may be previously stored in a table so as to set the increasing gage amount corresponding to the moving amount M by referring to the table. Alternatively, a value of the moving amount M itself may be set as the increasing gage amount.

At step S11, the CPU 36 executes score difference calculation processing. Specifically, the CPU 36 refers to the player and opponent characters' scores, which are calculated during the progress of the game, and updated and stored in the various other data storage area 80 of the main memory 40, and calculates a score difference therebetween.

At step S13, the CPU 36 corrects the gage amount based on the type of the player character selected at step S3 by referring to FIG. 4, and corrects the increasing gage amount calculated at step S9 based on the score difference calculated at step S11 by referring to FIG. 5. Specifically, a corrected gage amount is obtained by multiplying the calculated gage amount by the correction factor according to the type of the selected player character (FIG. 4) and the correction factor according to the score difference (FIG. 5).

At step S15, the CPU 36 determines whether or not the accumulated gage amount reaches the maximum value (e.g., 100) by referring to the accumulated gage amount storage area 76 of the main memory 40. In the case where determination at step S15 is "NO", i.e., in the case where the accumulated gage amount does not reach the maximum value, the CPU 36 adds at steps S17 the increasing gage amount corrected at step S13 to the accumulated gage amount stored in the accumulated gage amount storage area 76. That is, the CPU 36 updates a data value of the accumulated gage amount stored in the accumulated gage amount storage area 76. In the case where a value obtained by the addition of the increasing gage amount exceeds the above-described maximum value, the gage amount is updated so as to be equal to the above maximum value.

Figure 8:
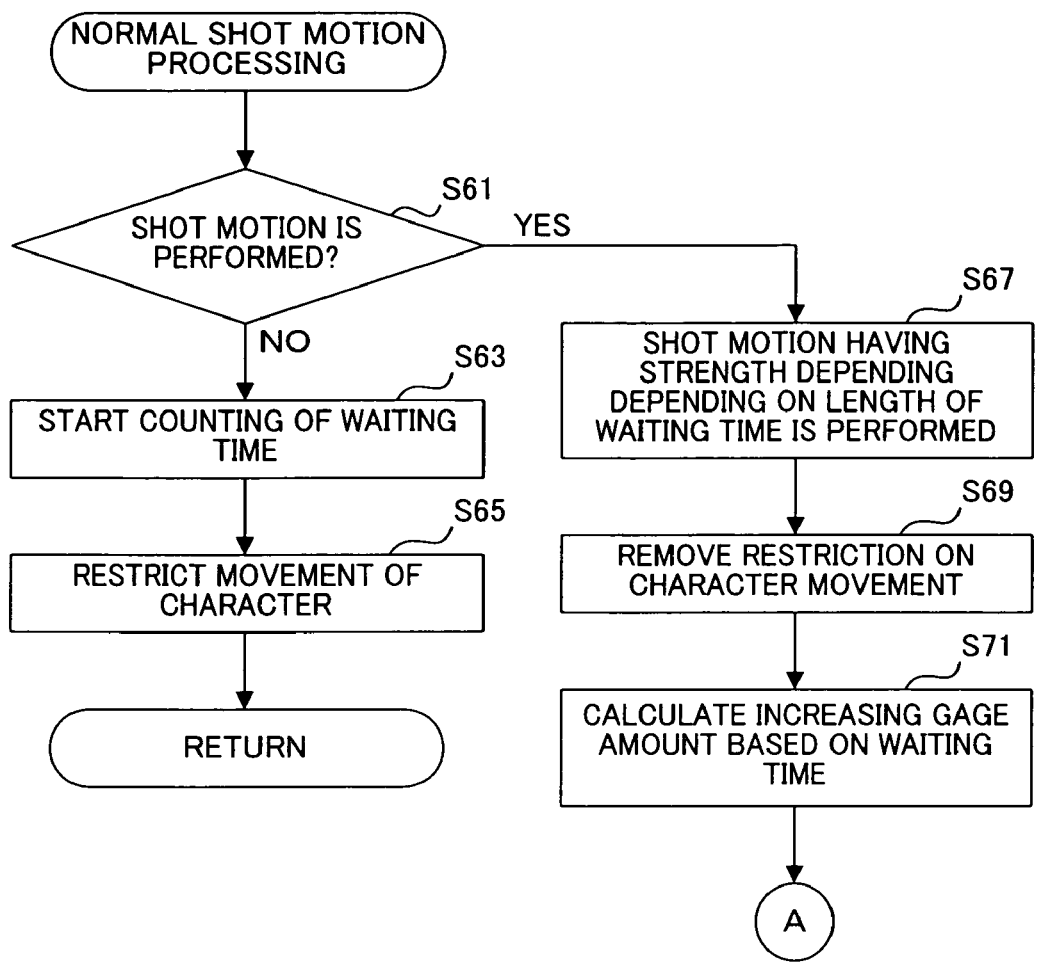
FIG. 8 is a flowchart showing an exemplary normal shot motion process in FIG. 7.
Figure 9:
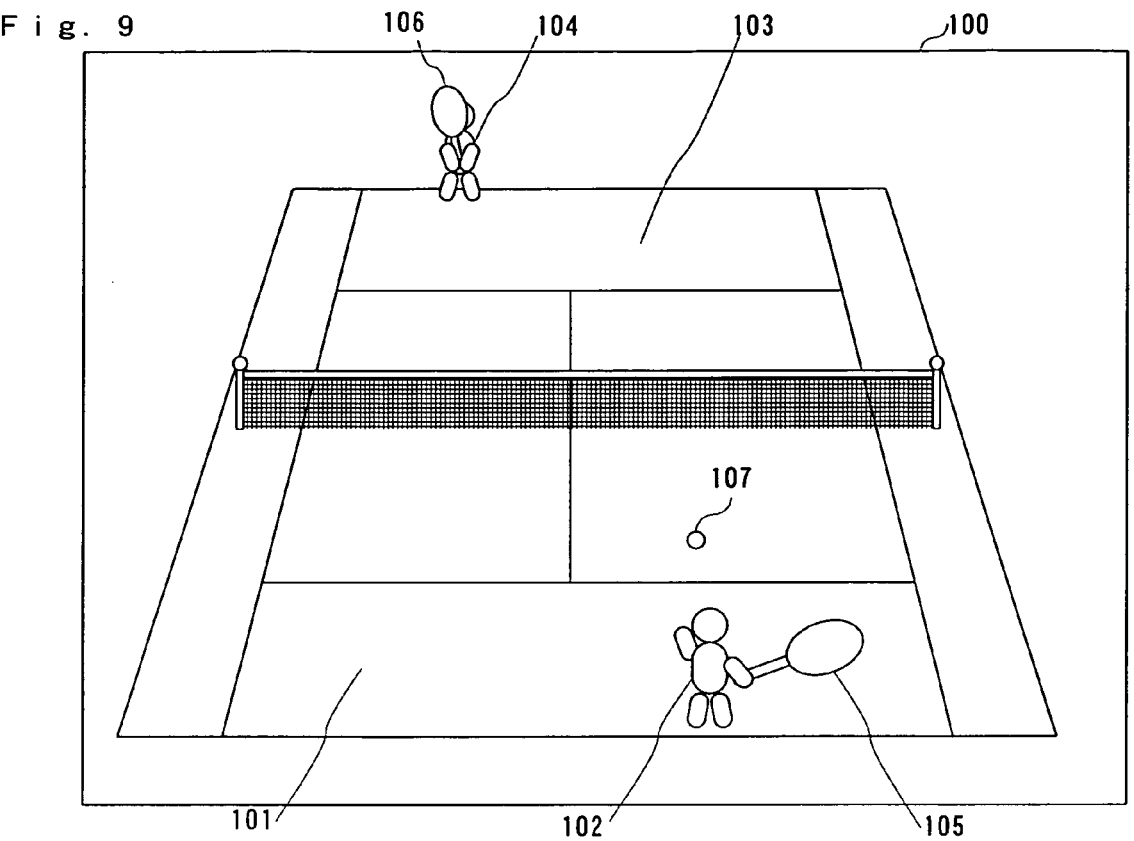
FIG. 9 is an illustration showing an exemplary game screen of a tennis game in the case where a gage is not displayed.
Figure 10:
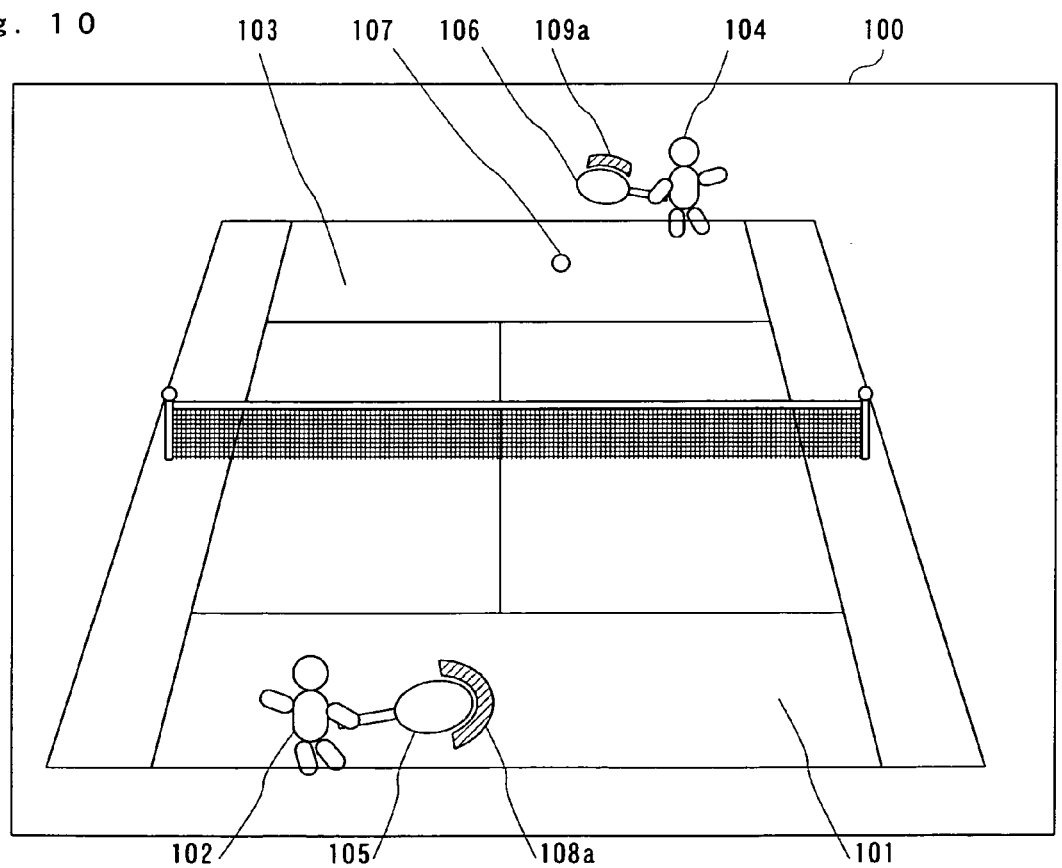
FIG. 10 is an illustration showing an exemplary game screen following FIG. 9.

At the following step S19, the CPU 36 changes the gage displayed on the monitor 34 in accordance with the accumulated gage amount stored (updated) in the accumulated gage amount storage area 76. An exemplary change in a gage display is shown in FIGS. 8 to 10, which will be described below.

On the other hand, in the case where determination at step S5 is "NO", i.e., in the case where a movement of the player character is not instructed by the player, the CPU 36 determines whether or not a shot instruction is issued to the player character at step S21. For example, the CPU 36 determines whether or not the player instructs the player character to hit a ball shot (perform an action for a ball) by depressing the button switch included in the operation means 26. Note that a shot instruction may be a normal shot instruction or a special shot instruction.

In the case where determination at step S21 is "YES", i.e., in the case where the player instructs the player character to perform a shot motion, the CPU 36 executes shot processing at step S23. Details of the shot processing are described in FIG. 7.

Figure 7:
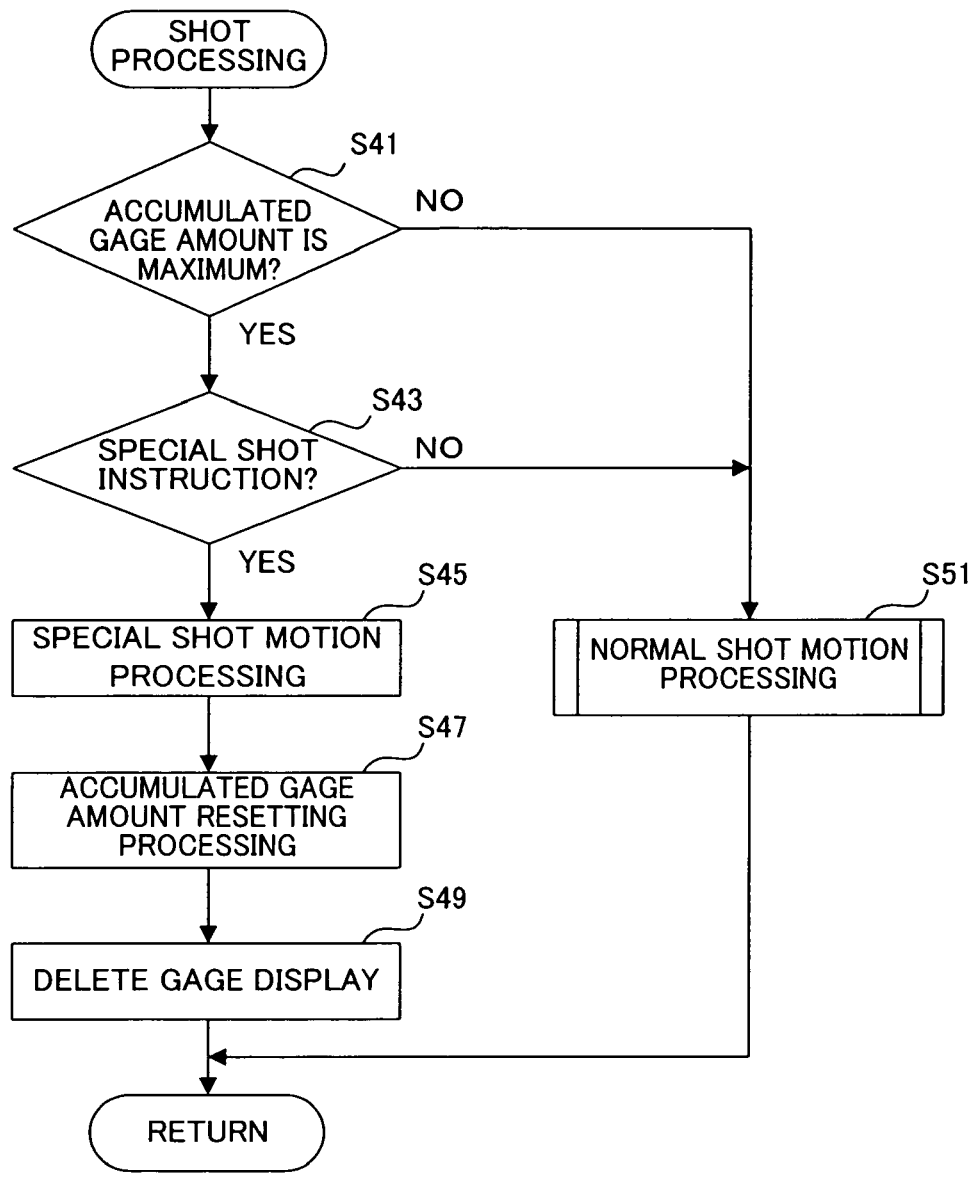
FIG. 7 is a flowchart showing an exemplary shot process operation in FIG. 6.

At step S41, which is a first step of FIG. 7, the CPU 36 determines whether or not a value of the accumulated gage amount stored in the accumulated gage amount storage area 76 of the main memory 40 reaches the maximum value. In the case where determination at step S41 is "YES", i.e., in the case where the accumulated gage amount reaches the maximum value, the CPU 36 performs a process at step S43 because it is allowed to cause the player character to perform a special shot (special action). Specifically, the CPU 36 determines whether or not a special shot is selected by the player at step S43. For example, in the case where the plurality of button switches included in the operation means 26 contain a button switch for a normal shot and a button switch for a special shot, the CPU 36 determines that the shot instruction issued at step S21 is a normal shot instruction or a special shot instruction based on which button switch is operated. Alternatively, for example, a shot selection screen for allowing the player to select either a normal shot or a special shot to perform may be displayed so as to urge the player to make a selection.

In the case where determination at step S43 is "YES", i.e., in the case where the player selects a special shot, the CPU 36 causes the player character to perform a special shot at step S45. As a result, an image in which the player character performs a special shot for the ball is displayed on the monitor 34. Such a special shot enables, for example, the player character to return a faster and harder ball compared to a ball returned by a normal shot.

At the following step S47, reset processing is performed for the accumulated gage amount storage area 76 of the main memory 40. In other words, the accumulated data value stored in the accumulated gage amount storage area 76 is set to zero. At the following step S49, the CPU 36 deletes a gage displayed around the racket object of the player character.

On the other hand, in the case where determination at step S41 is "NO", i.e., in the case where the accumulated gage amount does not reach the maximum value, a process at step S51 is performed because it is not allowed to cause the player character to perform a special shot. In other words, at step S51, normal shot motion processing is performed. The normal shot motion processing is performed for causing the player character to perform a normal shot. As a result of this processing, an image in which the player character performs a normal shot for the ball is displayed on the monitor 34. Details of the normal shot motion processing are described in FIG. 8.

At step S61 of FIG. 8, the CPU 36 first determines whether to cause the player character to perform a shot motion at once or to wait for an appropriate time to come. Specifically, determination at step S61 is made based on whether or not the player character and the ball are located in predetermined relative positions. More specifically, in the case where the ball is present in a predetermined range defined with respect to a position of the player character, determination is made that the player character and the ball are located in predetermined relative positions. Thus, it is determined that the player character should perform a shot motion at once. Note that the above-described predetermined range, which is a range in which the player character can hit a ball, is previously determined for each type of player character and/or shot (normal shot or special shot). On the other hand, in the case where the ball is not present in the above-described predetermined range, determination is made that the player character and the ball are not located in predetermined relative positions. As a result, the CPU 36 waits for an appropriate time for performing a shot motion to come.

In the case where determination at step S61 is "NO", i.e., in the case where the player character does not perform a shot motion, the CPU 36 starts counting of a waiting time at step S63. A waiting time corresponds to a "charge time" from when a shot instruction is issued to when an actual shot motion is performed. That is, a waiting time corresponds to a time elapsed after a shot instruction is given by the player at step S21. Typically, the waiting time is measured in the unit of frame time. At the following step S65, a movement restriction is put on the player character. Specifically, after step S65, compared to the moving amount of the player character from which the movement restriction is removed, the moving amount of the player character is reduced even if the player performs the same movement operation, until the restriction is removed at step S69, which will be described below. Also, in other embodiments, a movement of the player character may be disabled from step S65 until when the restriction is removed at step S69, which will be described below. When step S65 is completed, the CPU 36 ends the normal shot motion processing, and goes back to FIG. 6.

On the other hand, in the case where determination at step S61 is "YES", i.e., in the case where the player character performs a shot motion, the CPU 36 causes at step S67 the player character to perform a shot motion having the strength corresponding to the waiting time. Counting of this waiting time is started at the above-described step S63. Note that a shot motion to be performed at this step is a normal shot motion. However, the strength of the shot varies with the length of the waiting time. Specifically, the longer the waiting time is, the stronger the shot performed by the player character will be. As aforementioned, a movement restriction is put on the player character while the waiting time is measured. Thus, in order to lengthen the waiting time, the player has to move the player character quickly and within a short time to a position where ball shot is possible. That is, the experienced game player who can move the player character quickly and within a short time to a position where ball shot is possible can hit a stronger shot.

At step S69 following step S67, the CPU 36 removes the movement restriction put on the player character at step S65. Hereinafter, the player character can move in the usual manner. At the following step S71, the increasing gage amount is measured based on the waiting time. This waiting time corresponds to a time period from when counting of the waiting time is started at step S63 from when the normal shot is performed at step S67. The increasing gage amount is calculated, for example, by the following equation (3).

(increasing gage amount)=(60−(waiting time))×10.  (3)

In the above equation (3), in the case where the increasing gage amount is less than 10, the increasing gage amount is set to 10. That is, the lower limit of the increasing gage amount is 10. Also, the upper limit of the increasing gage amount in the above equation (3) is 600. As such, in the present embodiment, the shorter the waiting time, the higher the increasing gage amount. As a result, the inexperienced game player who cannot lengthen the waiting time can accumulate the gage in a shorter time, and perform a special shot more easily. When step S71 is completed, a process at step S11 as shown in FIG. 6 is executed.

Referring again to FIG. 7, in the case where determination at step S43 is "NO", i.e., in the case where the player does not select a special shot, the CPU 36 executes the normal shot motion processing at step S51.

When step S49 or S51 is completed, the CPU 36 ends the shot processing and goes back to FIG. 6.

Referring again to FIG. 6, in the case where determination at step S21 is "NO", i.e., in the case where the player does not instruct the player character to perform a shot motion, the CPU 36 determines at step S25 whether or not a score processing time has come. For example, determination is made that the score processing time has come when the player or opponent character's score is increased due to an effective shot by the player character or the opponent character or due to a mistake in either player's shot.

In the case where determination at step S25 is "YES", i.e., in the case where determination is made that the score processing time has come, the CPU 36 performs score calculation processing at step S27. Specifically, addition is performed for update of the score data of the player character or the opponent character stored in the various other data storage area 80 of the main memory 40.

On the other hand, in the case where determination at step S25 is "NO", i.e., in the case where determination is made that the score processing time has not come, the CPU 36 proceeds to step S29.

In the case where determination at step S15 is "YES", i.e., in the case where the accumulated gage amount reaches the maximum value, the CPU 36 is not allowed to accumulate the gage amount corrected at step S13. Thus, the CPU 36 proceeds to step S29.

At step S29, the CPU 36 determines whether or not the tennis match is ended, i.e., whether or not the tennis game is ended or whether or not the winner is decided. In the case where determination at step S21 is "NO", i.e., in the case where the tennis match is not ended, the CPU 36 goes back to step S5. On the other hand, determination at step S21 is "YES", i.e., in the case where determination is made that the tennis match is ended, the CPU 36 ends the processing by executing game end processing.

Although processing for moving the ball in the game space is not explicitly described in the flowcharts as shown in FIGS. 6 to 8, the CPU 36 moves the ball in the game space in accordance with a parameter determined by the shot motion of the player character (parameter such as a velocity and a direction). The above flowcharts describe processing for calculating the increasing gage amount based on the moving amount and the waiting time of the player character, and for accumulating the gage amount. As is the case with the player character, such processing is performed for the opponent character in the same manner.

In the above flowcharts, a shot motion having the strength corresponding to the waiting time is performed when the player re-issues the shot instruction, which has been issued by the player at the time that the ball is not present in the above-described predetermined range, as soon as the ball enters the predetermined range (see steps S21 and S23 of FIG. 6, and steps S61, S63, and S67 of FIG. 8). In other words, a shot motion itself is not performed unless the player re-issues the shot instruction as soon as the ball enters the predetermined range. In other embodiments, however, a shot motion having the strength corresponding to the waiting time may be automatically performed as soon as the ball enters the predetermined range only if the player has issued the shot instruction at the time that the ball is not present in the predetermined range. Also, in the case where the player does not re-issue the shot instruction as soon as the ball enters the predetermined range, a normal shot motion may be performed.

Figure 11:
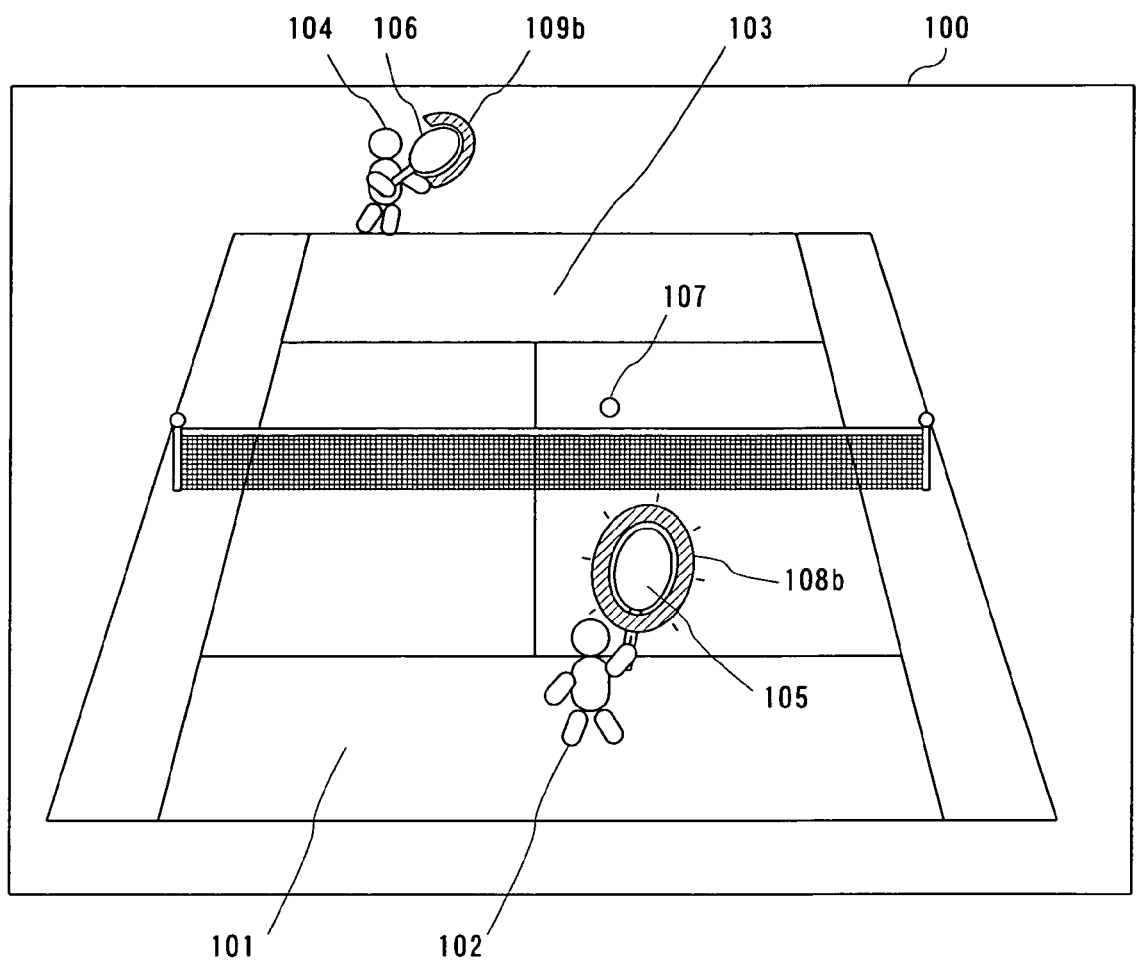
FIG. 11 is an illustration showing an exemplary game screen following FIG. 10.

FIGS. 9, 10, and 11 illustrate an exemplary game image 100 (display screen) of the tennis game displayed on the monitor 34 as a result of the processing as shown in FIGS. 6 to 8. FIG. 9 is an exemplary display screen displayed immediately after the game is started. In FIG. 9, a player character 102 is displayed in a court 101 located in the front side of the virtual space (i.e., a lower portion of the screen), whereas an opponent character 104 is displayed in a court 103 located in the back of the virtual space (i.e., an upper potion of the screen). The player character 102 and the opponent character 104 have racket objects 105 and 106 in their hands, respectively. A ball object 107 (ball) is displayed in the neighborhood of the player character 102. The player character 102, which is operated by the player's operation means 26, is freely movable in and around the court 101. The player moves the player character 102 to catch up with the ball object 107 entering the court 101, and causes the player character 102 to swing the racket object 105 and hit the ball object 107, thereby returning the ball to the court 103 of the opponent player. Also, the opponent character 104, which is operated by the opponent player's operation means 26 or the CPU 36, moves in and around the court 103, and returns the ball object 107 entering the court 103 by using the racket object 106, thereby returning the ball to the court 101 of the player. As described above, the tennis game according to the present embodiment is a match-up game performed between the player character 102 and the opponent character 104 by utilizing a ball in such a manner that a shot (action) is performed for the ball object 107 by moving the player character 102 to catch up with the ball object 107 which moves in the virtual space. In FIG. 9, the player character 102 is trying to serve the ball object 107. In this case, the gage amount is zero because the moving amounts of both the player character 102 and the opponent character 104 are zero, and any normal shot to be performed after the charge time has elapsed (such a normal shot is usually referred to as a "charge shot"; hereinafter referred to as a "charge shot") is not performed.

When the player character 102 and the opponent character 104 move as the game progresses, the gage amount (increasing gage amount) of each character, which is calculated based on the moving amount, etc., is accumulated. Also, when any of the player character 102 and the opponent character 104 performs the "charge shot", the gage amount (increasing gage amount) calculated based on the waiting time (charge time) is accumulated. As a result of the accumulation of the gage amount, as shown in FIG. 10, a gage 108a corresponding to the accumulated gage amount of the player character 102 and a gage 109a corresponding to the accumulated gage amount of the opponent character 104 are displayed. The gages 108a and 109a are displayed around the racket objects 105 and 106 respectively held by the player character 102 and the opponent character 104. Note that the size (or length, area, etc.) of the gages 108a and 109a varies with a value of the accumulated gage amount. As described above, the gages 108a and 109a are displayed in connection with the player character 102 and the opponent character 104 (in this case, the gages 108a and 109a are displayed around the racket objects 105 and 106 respectively held by the characters 102 and 104), whereby the player can see the display state of the gage 108a while keeping an eye on the player character 102. Thus, the player can check the gage amount with ease even if he/she is operating the player character. Note that it is preferable that the gage be displayed in such a manner that a display position of the gage changes in accordance with a position of the player character. Also, the display position of the gage is not limited to a space surrounding the racket. The gage may be displayed around the player character, for example.

FIG. 11 is an exemplary gage display when the accumulated gage amount of the player character 102 reaches the maximum value. In this case, a gage 108b is displayed around the racket object 105 of the player character 102. The gage 108b is displayed in such a manner that the racket object 105 is encircled by a ring shaped gage. Furthermore, the displayed gage 108b flashes on and off while the gage amount is the maximum value. Thus, it is possible to display the gage in such a manner that the player can see at a glance that the accumulated gage amount reaches the maximum value. In FIG. 11, a gage 109b whose size increases (varies) with the increase of the accumulated gage amount is displayed around the racket object 106 of the opponent character 104.

As described above, the gages 108a, 108b, 109a and 109b displayed around the racket objects 105 and 106 are displayed in such a manner that the racket objects 105 and 106 are encircled by the respective ring shaped gages while the accumulated gage amount is the maximum value. On the other hand, when the accumulated gage amount does not reach the maximum value, the gage is displayed as an incomplete (partial) ring whose size varies depending on a proportion of the current accumulated gage amount to the maximum value. That is, a gage to be displayed varies depending on a value of the gage amount.

As shown in FIGS. 10 and 11, when the gage 108a in the shape of a partial ring is displayed around the racket object 105, the gage 108a is displayed in such a manner that the gage orbits around the racket object 105. Similarly, when the gage 109a or 109b in the shape of a partial ring is displayed around the racket object 106, the gage 109a or 109b is displayed in such a manner that the gage orbits around the racket object 106. As described above, the displayed gage moves in an orbital manner, whereby it is possible to highlight the gage more effectively. Thus, it is possible to facilitate the player seeing the display state of the gage.

According to the above embodiment, in a ball game such as a tennis game, the gage amount is set in accordance with the moving amount of the player character. A player can gain the advantage in the game over his/her opponent player by performing a special shot, if the accumulated gage amount permits. In the tennis game, an inexperienced game player often moves the player character more than necessary due to the difficulty in grasping an accurate position from which the ball can be returned. According to the present embodiment, the more inexperienced the game player, who often moves the player character more than necessary, the quicker he/she can accumulate the gage amount. Thus, it is possible to facilitate the inexperienced game player performing an advantageous special shot. As such, in the present embodiment, even an inexperienced game player can perform a special technique with ease, whereby he/she can fully enjoy the tennis game. Also, in the case where a beginning (inexperienced) game player plays against a practiced (experienced) game player, the beginning game player can carry forward the match in his/her favor. Thus, it is possible to realize a heated seesaw match by preventing the practiced game player from leaving the beginning game player at a one-sided disadvantage.

Also, according to the present embodiment, in a ball game such as a tennis game, the gage amount is set in accordance with the length of a "charge shot" time. The shorter the "charge shot" time, the quicker the gage amount is accumulated, thereby allowing a player to perform a special shot. As aforementioned, the more experienced the game player is, the more he/she can perform a shot by utilizing a "charge shot". Thus, the more inexperienced the game player is, the quicker the gage amount is accumulated, thereby allowing the player to perform a special shot. Therefore, in the present embodiment, since even a beginning game player can perform a special technique for the above-described reason, it can be said that even such an inexperienced game player can fully enjoy the tennis game. Also, as has been mentioned, in the case where a beginning (inexperienced) game player plays against a practiced (experienced) game player, the beginning game player can carry forward the match in his/her favor. Thus, it is possible to realize a heated seesaw match by preventing the practiced game player from leaving the beginning game player at a one-sided disadvantage.

Note that, in the above-described embodiment, it is assumed that the increasing gage amount calculated based on the moving amount of the player character is corrected based on a type of the selected player character and a score difference, such that the corrected increasing gage amount is accumulated. In other embodiments, however, the increasing gage amount calculated based on the moving amount of the player character may be accumulated without being corrected. Alternatively, the increasing gage amount may be corrected based on either a type of the selected player character or a score difference.

In the above-described embodiment, it is assumed that the player character is permitted to perform a special shot when the accumulated gage amount reaches the maximum value. However, the player character may be permitted to perform a special shot when the accumulated gage amount reaches a predetermined value (e.g., 80% of the maximum value) other than the maximum value. Alternatively, the gage amount to be consumed by each special shot may be previously set, such that a specific special shot can be performed as long as the gage amount to be consumed by the specific special shot is accumulated.

In the above-described embodiment, the gage amount may be increased in accordance with the moving amount of the ball as well as the moving amount and the waiting time of the player character. For example, the moving amount of the ball per predetermined unit time (e.g., one frame) may be detected so as to calculate the increasing gage amount in accordance with the detected moving amount. For instance, the increasing gage amount may be calculated by the following equation (4).

$$\text{(increasing gage amount)} = \text{(moving amount of ball)}/10 \qquad (4)$$

In the tennis game, a beginning game player finds it difficult to hit a strong shot or hit a shot to a corner. As a result, the more inexperienced the game players are, the longer a rally will continue for a protracted period. In the above-described embodiment, however, the gage amount is increased in accordance with the moving amount of the ball, and a continued rally allows the players to perform a special shot, whereby it is possible to end a rally. Thus, it is possible to prevent the player from getting bored with the game due to a protracted rally, or finding the game uninteresting due to the difficulty in getting a score. Note that, in place of the above-described moving amount (moving distance) of the ball, the gage amount may be increased in accordance with the moving time of the ball.

In the above-described embodiment, a tennis game has been taken as an example. However, the present invention can be applied to any sport game in which a player character and an opponent character rally a hit object in a game space. For example, the present invention can be applied to a badminton game or a table tennis game. In the case where the present invention is applied to a table tennis game, it is conceivable that only a racket is displayed instead of a human-like character, and a player operates a movement of the racket. In this case, the gage amount may be increased in accordance with the moving amount of the racket on the assumption that the racket corresponds to the player character.

While the invention has been described in detail, the foregoing description is in all aspects illustrative and not restrictive. It is understood that numerous other modifications and variations can be devised without departing from the scope of the invention.

What is claimed is:

1. A game system for executing a sport game in which a player character and an opponent character rally a hit object in a virtual game space, comprising:
   a movement controller configured to move the player character in the virtual game space in accordance with an operation by a player;
   a moving amount detector configured to detect the player character's moving amount per predetermined unit time at each predetermined time interval;
   an adder configured to add the player character's moving amount per predetermined unit time for accumulation; and
   a motion controller configured to control the motion of the player character so as to provide the player with the option of instructing the player character to perform a hitting motion of a first type and to prohibit the player from instructing the player character to perform a hitting motion of a second type, different from the first type, when a result of addition by the adder does not exceed a predetermined value, and so as to provide the player with the option of instructing the player character to perform the hitting motion of the first type or the hitting motion of the second type when a result of addition by the adder exceeds the predetermined value.

2. The game system according to claim 1, further comprising:
   a parameter calculator configured to calculate, at each predetermined time interval, a predetermined parameter value which indicates the moving amount detected at each predetermined time by the moving amount detector;
   a score calculator configured to calculate scores of the player character and the opponent character;
   a score difference calculator configured to calculate a difference between the scores of the player character and the opponent character; and
   a first correction unit configured to correct the predetermined parameter value calculated by the parameter calculator based on the score difference calculated by the score difference calculator,
   wherein the adder adds the predetermined parameter value corrected by the first correction unit to the current addition results for accumulation, and
   wherein the motion controller motion control determines whether or not the sum of the player character's moving amount exceeds the predetermined amount by using a result of the addition by the adder.

3. The game system according to claim 2,
   wherein the first correction unit corrects the predetermined parameter value in such a manner that the greater a value obtained by subtracting the score of the opponent character from the score of the player character is, the smaller the predetermined parameter value becomes.

4. The game system according to claim 1, further comprising:
   a rally determination unit configured to determine, at each predetermined time interval, whether or not a rally is continued,
   wherein the moving amount detector detects the moving amount only when the rally determination unit determines that a rally is continued.

5. The game system according to claim 1, further comprising:
   a gage amount display configured to display a gage indicating a value, which is obtained as a result of the addition by the adder, in a position which is determined with respect to the player character.

6. The game system according to claim 1, further comprising:
   a parameter calculator configured to calculate, at each predetermined time interval, a predetermined parameter value which indicates the moving amount detected at each predetermined time by the moving amount detector;
   a character selector configured to select any one player character from among a plurality of types of player characters; and
   a second correction unit configured to correct the predetermined parameter value calculated by the parameter calculator by a correction factor which is previously set in accordance with a type of the player character selected by the character selector,
   wherein the adder adds the predetermined parameter value corrected by the second correction unit for accumulation, and
   wherein the motion controller determines whether or not the sum of the player character's moving amount exceeds the predetermined amount by using a result of the addition by the adder.

7. A game system for executing a sport game in which a player character and an opponent character rally a hit object in a virtual game space, comprising:
   a waiting decision unit configured to decide, when an operation for causing the player character to perform a hitting motion is performed by a player, whether the hitting motion is performed immediately or postponed, based on relative positions of the player character and the hit object;
   a waiting time measurement unit configured to measure a waiting time of the hitting motion when the waiting decision unit decides that the hitting motion is postponed;
   a hitting execution unit configured to cause the player character to perform a hitting motion having a strength corresponding to a length of the waiting time measured by the waiting time measurement unit when the waiting decision unit decides that the hitting motion is performed;

a parameter calculator configured to calculate a predetermined parameter value based on a waiting time in such a manner that the shorter the waiting time measured by the waiting time measurement unit, the greater the predetermined parameter value;

an adder configured to add the predetermined parameter value calculated by the parameter calculator for accumulation; and a motion controller configured to control the motion of the player character so as to provide the player with the option of instructing the player character to perform a hitting motion of a first type and to prohibit the player from instructing the player character to perform a hitting motion of a second type, different from the first type, when a result of addition by the adder does not exceed a predetermined value, and so as to provide the player with the option of instructing the player character to perform the hitting motion of the first type or the hitting motion of the second type when a result of addition by the adder exceeds the predetermined value.

8. The game system according to claim 7, further comprising:

a gage amount display configured to display a gage indicating a value, which is obtained as a result of the addition by the adder, in a position which is determined with respect to the player character.

9. The game system according to claim 7, further comprising:

a character selector unit configured to select any one player character from among a plurality of types of player characters; and a second correction unit configured to correct the predetermined parameter value calculated by the parameter calculator by a correction factor which is previously set in accordance with a type of the player character selected by the character selector unit.

10. A non-transitory computer-readable storage medium storing a game program causing a computer of a game system, which executes a sport game in which a player character and an opponent character rally a hit object in a virtual game space, to perform:

moving the player character in the virtual game space in accordance with an operation by a player;

detecting the player character's moving amount per predetermined unit time at each predetermined time interval;

adding the player character's moving amount per predetermined unit time for accumulation; and controlling the motion of the player character so as to provide the player with the option of instructing the player character to perform a hitting motion of a first type and to prohibit the player from instructing the player character to perform a hitting motion of a second type, different from the first type, when a result of the addition does not exceed a predetermined value, and so as to provide the player with the option of instructing the player character to perform the hitting motion of the first type or the hitting motion of the second type when a result of the addition exceeds the predetermined value.

11. A non-transitory computer-readable storage medium storing a game program causing a computer of a game system, which executes a sport game in which a player character and an opponent character rally a hit object in a virtual game space, to perform:

deciding, when an operation for causing the player character to perform a hitting motion is performed by a player, whether the hitting motion is performed immediately or postponed, based on relative positions of the player character and the hit object;

measuring a waiting time of the hitting motion when the hitting motion is decided to be postponed;

causing the player character to perform a hitting motion having a strength corresponding to a length of the measured waiting time when the hitting motion is decided to be performed;

calculating a predetermined parameter value based on a waiting time in such a manner that the shorter the measured waiting time is, the greater the predetermined parameter value is;

adding the calculated predetermined parameter value for accumulation; and controlling the motion of the player character so as to provide the player with the option of instructing the player character to perform a hitting motion of a first type and to prohibit the player from instructing the player character to perform a hitting motion of a second type, different from the first type, when a result of the addition does not exceed a predetermined value, and so as to provide the player with the option of instructing the player character to perform the hitting motion of the first type or the hitting motion of the second type when a result of the addition exceeds the predetermined value.

12. A game apparatus for executing a sport game in which a player character and an opponent character rally a hit object in a virtual game space, comprising:

a processing system, including one or more computer processors, the processing system being configured to perform at least:

a movement control to move the player character in the virtual game space in accordance with an operation by a player;

a moving amount detection to detect the player character's moving amount per predetermined unit time at each predetermined time interval;

addition to add the player character's moving amount per predetermined unit time for accumulation; and motion control to control the motion of the player character so as to provide the player with the option of instructing the player character to perform a hitting motion of a first type and to prohibit the player from instructing the player character to perform a hitting motion of a second type, different from the first type, when a result of the addition does not exceed a predetermined value, and so as to provide the player with the option of instructing the player character to perform the hitting motion of the first type or the hitting motion of the second type when a result of the addition exceeds the predetermined value.

13. A game apparatus for executing a sport game in which a player character and an opponent character rally a hit object in a virtual game space, comprising:

a processing system, including one or more computer processors, the processing system being configured to perform at least:

a waiting decision to decide, when an operation for causing the player character to perform a hitting motion is performed by a player, whether the hitting motion is performed immediately or postponed, based on relative positions of the player character and the hit object;

a waiting time measurement to measure a waiting time of the hitting motion when the waiting decision decides that the hitting motion is postponed;

a hitting execution to cause the player character to perform a hitting motion having a strength corresponding to a length of the waiting time measured by the waiting time measurement when the waiting decision decides that the hitting motion is performed;

a parameter calculation to calculate a predetermined parameter value based on a waiting time in such a manner that the shorter the waiting time measured by the waiting time measurement, the greater the predetermined parameter value;

addition to add the predetermined parameter value calculated by the parameter calculator for accumulation; and motion control to control the motion of the player character so as to provide the player with the option of instructing the player character to perform a hitting motion of a first type and to prohibit the player from instructing the player character to perform a hitting motion of a second type, different from the first type, when a result of the addition does not exceed a predetermined value, and so as to provide the player with the option of instructing the player character to perform the hitting motion of the first type or the hitting motion of the second type when a result of the addition exceeds the predetermined value.

14. A method for executing a sport game in which a player character and an opponent character rally a hit object in a virtual game space, the method comprising:

moving the player character in the virtual game space, via one or more computer processors, in accordance with an operation by a player;

detecting, via said one or more computer processors, the player character's moving amount per predetermined unit time at each predetermined time interval;

adding, via said one or more computer processors, the player character's moving amount per predetermined unit time for accumulation; and controlling the motion of the player character, via said one or more computer processors, so as to provide the player with the option of instructing the player character to perform a hitting motion of a first type and to prohibit the player from instructing the player character to perform a hitting motion of a second type, different from the first type, when a result of the adding does not exceed a predetermined value, and so as to provide the player with the option of instructing the player character to perform the hitting motion of the first type or the hitting motion of the second type when a result of the adding exceeds the predetermined value.

15. A method for executing a sport game in which a player character and an opponent character rally a hit object in a virtual game space, the method comprising:

deciding, via one or more computer processors, when an operation for causing the player character to perform a hitting motion is performed by a player, whether the hitting motion is performed immediately or postponed, based on relative positions of the player character and the hit object;

measuring, via said one or more computer processors, a waiting time of the hitting motion when the hitting motion is decided to be postponed;

causing, via said one or more computer processors, the player character to perform a hitting motion having a strength corresponding to a length of the measured waiting time when the hitting motion is decided to be performed;

calculating, via said one or more computer processors, a predetermined parameter value based on a waiting time in such a manner that the shorter the measured waiting time is, the greater the predetermined parameter value is;

adding, via said one or more computer processors, the calculated predetermined parameter value for accumulation; and controlling, via said one or more computer processors, the motion of the player character so as to provide the player with the option of instructing the player character to perform a hitting motion of a first type and to prohibit the player from instructing the player character to perform a hitting motion of a second type, different from the first type, when a result of the addition does not exceed a predetermined value, and so as to provide the player with the option of instructing the player character to perform the hitting motion of the first type or the hitting motion of the second type when a result of the addition exceeds the predetermined value.

* * * * *